United States Patent
Köhler et al.

(10) Patent No.: US 6,773,480 B1
(45) Date of Patent: Aug. 10, 2004

(54) RING FILTER CONSISTING OF STAR-SHAPED FOLDED FILTERING MATERIAL

(75) Inventors: Wilhelm Köhler, Stuttgart (DE); Wilhelm Schönherr, Bleiburg (AT); Norbert Vorbach, Auenwald (DE)

(73) Assignee: Mahle Filtersysteme GmbH, Stuttgart (DE)

(*) Notice: Subject to any disclaimer, the term of this patent is extended or adjusted under 35 U.S.C. 154(b) by 0 days.

(21) Appl. No.: 10/019,619
(22) PCT Filed: May 19, 2000
(86) PCT No.: PCT/DE00/01623
§ 371 (c)(1), (2), (4) Date: Dec. 20, 2001
(87) PCT Pub. No.: WO01/00300
PCT Pub. Date: Jan. 4, 2001

(30) Foreign Application Priority Data

Jun. 23, 1999 (DE) ............................................. 199 28 448

(51) Int. Cl.$^7$ .............................................. B01D 46/02
(52) U.S. Cl. ............................. 55/498; 55/500; 55/501; 55/502; 55/510; 55/521
(58) Field of Search ................................. 55/385.3, 498, 55/500, 501, 502, 510, 521; 123/198 E

(56) References Cited

U.S. PATENT DOCUMENTS

| | | | | |
|---|---|---|---|---|
| 4,349,363 A | * | 9/1982 | Patel et al. | 55/498 |
| 5,484,466 A | * | 1/1996 | Brown et al. | 55/498 |
| 5,938,804 A | * | 8/1999 | Engel et al. | 55/498 |
| 6,056,799 A | * | 5/2000 | Unrath et al. | 55/502 |
| 2002/0184864 A1 | * | 12/2002 | Bishop et al. | 55/498 |

FOREIGN PATENT DOCUMENTS

| | | | |
|---|---|---|---|
| DE | 809796 | 8/1951 | |
| DE | 4024898 | 2/1992 | |
| EP | 0498757 | 8/1992 | |
| EP | 0 498 757 A1 * | 8/1992 | ........... B01D/46/24 |
| FR | 2717706 | 9/1995 | |
| WO | 9722795 | 6/1997 | |

* cited by examiner

*Primary Examiner*—Blaine Copenheaver
*Assistant Examiner*—Jason M. Greene
(74) *Attorney, Agent, or Firm*—Collard & Roe, P.C.

(57) ABSTRACT

A ring filter comprising a star-shaped folded filtering material and a closure on both front sides thereof in the form of a closed end disc. This closure has a plate-shaped insert forming the central area of the closure and located radially inside the filtering material. The insert is made of a different material from that of the rest of the closure. The invention aims at providing a ring filter than can be rationally produced and that is more resistant and durable. To this end, the ring filter has a radially permeable tubular frame that extends approximately along the entire axial length of the ring filter that borders radially inward on the filtering material; and wherein the plate-shaped insert is connected to the tubular frame and wherein the material of the closure is a foamed plastic.

10 Claims, 2 Drawing Sheets

RING FILTER CONSISTING OF STAR-SHAPED FOLDED FILTERING MATERIAL

CROSS REFERENCE TO RELATED APPLICATIONS

Applicants claim priority under 35 U.S.C. §119 of GERMAN Application No. 199 28 448.2 filed on 23 JUN. 1999. Applicants also claim priority under 35 U.S.C. §371 of PCT/DE00/01623 filed on 19 MAY 2000. The international application under PCT article 21(2) was not published in English.

BACKGROUND OF THE INVENTION

The invention concerns a ring filter made of star-shaped folded filtering material.

A ring filter of this type is known from EP 0 498 757 A1.

The invention concerns itself with the problem of designing the closure on the front side in the ring filter according to the preamble, particularly using a foamed, elastic plastic closure material, so it is durable, as well as allowing an economical production of the closure region of this type of filter through an appropriate design of the closure region. In addition, a constructive design is to be provided in the closure region on the front side which ensures a secure and tight attachment of the closure material to the folded filtering material.

This problem is solved by the implementation of a ring filter described below.

SUMMARY OF THE INVENTION

Advisable embodiments are the object of the sub-claims and will be described in more detail with reference to an illustrated exemplary embodiment.

The following particular advantages arise through the solution according to the invention.

Particularly in ring filters having large dimensions, such as in ring filters which are, for example, intended as air filters for commercial vehicles, and in which the closure material consists of a foamed plastic material having elastic properties, not only is expensive plastic material saved by the plate-shaped insert, but the closed ring filter floor can be reliably protected from oscillations of the floor, which cause unpleasant noises, by the selection of a stiff material for the plate-shaped insert. These types of floor oscillations can, as a rule, not be avoided with a continuous floor made of foamed, elastic plastic material.

The connection of the plate-shaped insert into the closure on the front side of the ring filter element allows an economic production of the filter, because the plate-shaped insert can be inserted together with the ring filter element and the tubular frame present therein into the mold, in which the closure on the front side is molded onto the filtering material, including the tubular frame supporting the material.

If a connection of the plate-shaped insert to the tubular frame is selected in which the plate-shaped insert is fixed axially inside the tubular frame, a particularly durable attachment of the plate-shaped insert in the molded-on closure material is ensured. The connection region is then not subjected to floor oscillations during operation of the filter.

A precise production of the ring filter in regard to its length is allowed by axial fixing of the plate-shaped insert on the tubular frame of the ring filter. More detail is provided on this matter in the description of the exemplary embodiment.

BRIEF DESCRIPTION OF THE DRAWINGS

The drawing illustrates an exemplary embodiment.

DETAILED DESCRIPTION

Figure 1:
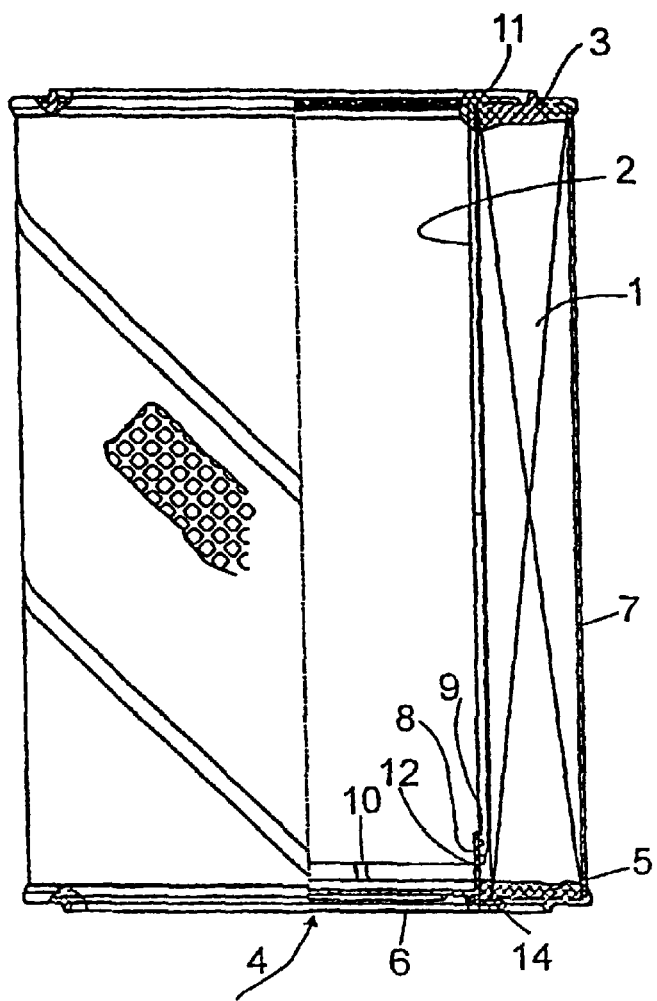
FIG. 1 shows a ring filter element, partially in a view, partially in a longitudinal section.
Figure 2:
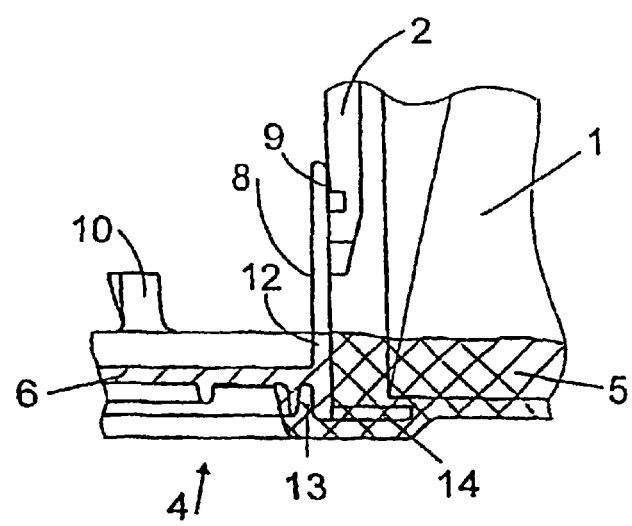
FIG. 2 shows a detail II from FIG. 1.

The ring filter shown in FIG. 1 comprises star-shaped folded filtering material 1, which is supported radially on the inside on a radially permeable tubular frame 2, as well as coverings on its front side. These coverings are, on a front side, a centrally open, ring-shaped closure 3 made of molded-on polyurethane, with the polyurethane enclosing the adjoining end of the tubular frame 2.

The opposite front side of the ring filter is covered with a closed end disk 4. The radial outside of this end disk 4 consists, in the region covering the filtering material 1, of plastic 5 molded on as polyurethane and, molded into the polyurethane in the center, on the radial inside, a circular disk 6 made of another relatively stiff plastic. This plastic can, for example, be recycled material. On the radial outside, the filtering material is covered with a ring-shaped grid 7 which is embedded in the front side plastic closures.

Figure 3:
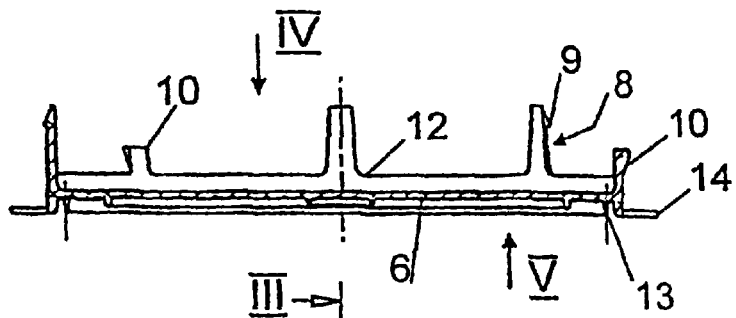
FIG. 3 shows a section along line III—III in FIG. 4 through a plate-shaped insert implemented as a circular disk.
Figure 4:
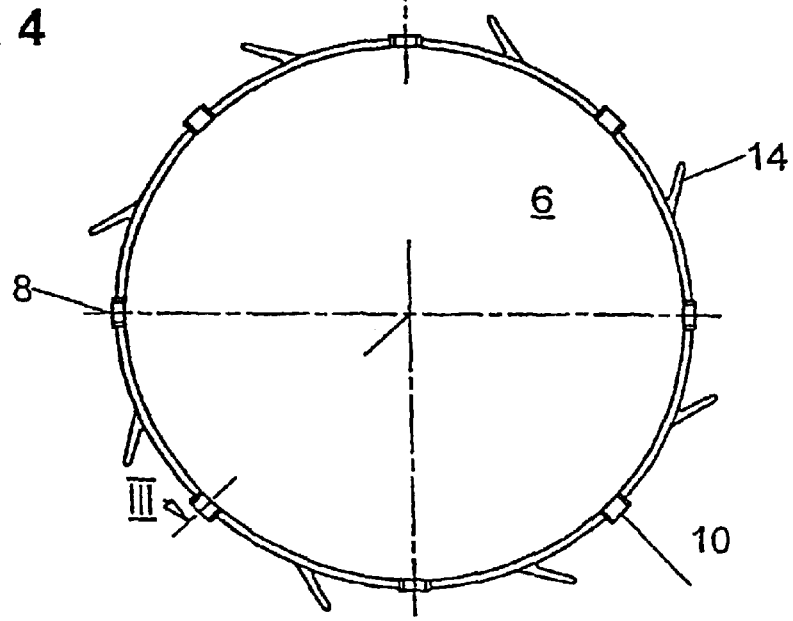
FIG. 4 shows a view of the circular disk in the direction of the arrow IV in FIG. 3.
Figure 5:
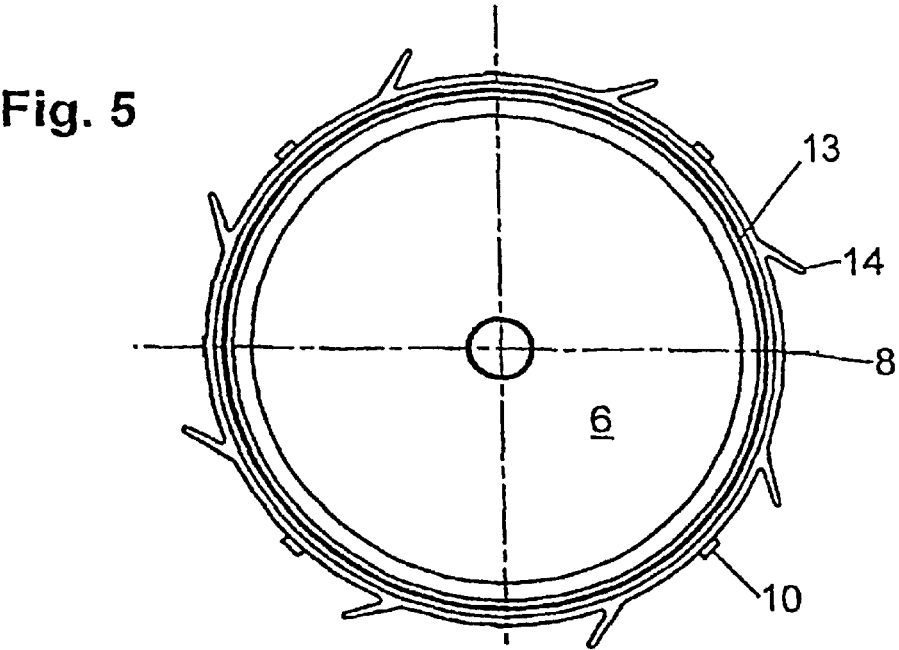
FIG. 5 shows a view of the circular disk in the direction of the arrow V in FIG. 3.

The circular disk shown in detail in FIGS. 3 to 5 has axially aligned flexible tongues 8 with barbs 9 molded onto their ends. On the side of the circular disk 6 onto which the flexible tongues 8 are molded, there are axially projecting supports 10 distributed around the circumference. To connect the circular disk 6 with the tubular frame 2, the circular disk 6 having the supports 10 is placed on the tubular frame 2 so it is stopped axially by the frame and is axially fixed so that it does not move in recesses of the tubular frame 2 via the flexible tongues 8 which elastically engage in the recesses.

The outer diameter of the circular disk 6 is smaller than the inner diameter of the star-shaped folded filtering material 1, which results in a ring gap interval being provided between the edge of the circular disk 6 and the filtering material 1.

A filter according to the invention is preferably produced as follows.

A ring-shaped filter star is produced from filtering a material 1, whose outside is coated with a grid 7. The tubular frame 2 is introduced radially into the inside of the filtering material 1. The circular disk 6 is already axially secured in this tubular frame 2 when it is introduced into the ring-shaped filtering material 1.

First, the end disk which remains open in the center is molded onto the ring filter prepared in this way. The material for this end disk is polyurethane, whose liquid starting components are poured into a mold for foaming. The end of the prepared ring filter whose open end disk is to be implemented is placed in this mold. In the mold, into which the components for the polyurethane to be foamed are poured in as liquids, the ring filter is supported exclusively over localized small regions over the front side of the filtering material 1 on supporting elements.

The support in the mold is of a type such that the end disk consisting of polyurethane can be implemented by foaming of the liquid starting components. The tubular frame 2 has, on the end facing this open end disk, a ring shoulder 11 which receives the front side of the filtering material axially, so that in this way the tubular frame 2 assumes a position exactly defined axially relative to the filtering material 1.

In a subsequent production step, the closed end disk 4 is implemented on the opposite front end of the ring filter, where it is to be affixed. For this purpose, the appropriate front side of the prepared ring filter is placed into a mold, which was previously filled with the starting components for a polyurethane to be foamed. The ring filter is supported in this mold via the axially defined circular disk 6 connected with the tubular frame 2. The support of the circular disk 6 in the casting mold is of a type such that the circular disk 6 can only be embedded and/or enclosed by the foaming polyurethane in an outer radial region. A ring collar 12, which points to the inside of the ring filter and which is formed onto the ring disk 6, ensures that the polyurethane rising from the floor of the casting mold can rise as intended into a ring gap between the circular disk 6 and the filtering material 1.

On the surface of the circular disk 6 which comes to rest axially outward, a peripheral ring groove 13 is provided radially on the outside to achieve a labyrinth seal relative to the polyurethane foam. The supports 10, on which the tubular frame 2 rests axially, ensure radial through openings into which the foaming polyurethane can flow for at least axial contact on the ring collar 12.

Due to the alignment of the prepared ring filter by means of the circular disk 6 in the casting mold for foaming with polyurethane, an absolutely equal installation length of the ring filter can always be achieved, independent of the axial length tolerances of the filtering material.

The circular disk 6 can be provided radially on the outside with radially extending fingers 14 which are affixed as far as possible axially on the surface which comes to rest axially on the outside in the ring filter. The filtering material 1 can press against these fingers 14 if the closed end disk 4 is molded onto the ring filter before the open end disk. However, these types of fingers 14 have the disadvantage that a circular disk 6 provided with them cannot be introduced together with the tubular frame 2 into the central cavity of the filtering material 1 if it is already connected with the tubular frame.

In order that the tubular frame can be introduced without complications into the central cavity inside the star-shaped folded filtering material 1, the edge of the tubular frame introduced is provided with an introduction bevel around its circumference.

The ring filter described is an air filter having an axial length of 460 mm and an outer diameter of 310 mm for a commercial vehicle. The diameter of the plate-shaped insert, i.e. the circular disk 6, visible from the outside is 170 mm for an actual outer diameter of the circular disk of 185 mm.

What is claimed is:

1. A ring filter having two ends comprising:
   a) a star-shaped folded filtering material;
   b) a radially permeable tubular frame having two ends, and which extends approximately over an entire axial length of said ring filter adjoining said filtering material radially on an inside surface of said filtering material;
   c) a closure coupled to one end of said radially permeable tubular frame, said closure comprising:
      i) a plate shaped insert coupled to said radially permeable tubular frame; and
      ii) a molded closure section coupled to said plate shaped insert, extending radially outside said plate shaped insert and formed from a foamed plastic wherein said plate shaped insert is made from a different material; and
   d) a ring shoulder formed on said tubular frame opposite said closure, wherein said ring shoulder joins a closed end of said filtering material of said ring filter.

2. The ring filter according to claim 1, wherein, said closure material is a polyurethane foam.

3. The ring filter according to claim 1, wherein said plate-shaped insert is interlocked with said tubular frame.

4. The ring filter according to claim 1, wherein
   said plate-shaped insert is a circular disk having an outer diameter that is smaller than an inner diameter of said filtering material,
   and wherein a radial outside region of said plate-shaped insert extends axially into a region of said filtering material,
   and wherein said plate shaped insert is connected with said tubular frame and extends axially a uniform distance relative to said tubular frame.

5. The ring filter according to claim 1, wherein, said plate-shaped insert has a ring collar projecting in a radially outward direction towards said tubular frame.

6. The ring filter according to claim 1, wherein, said plate-shaped insert has a plurality of radially projecting fingers extending radially outside for an axial stop on said filtering material.

7. The ring filter according to claim 1, further comprising a plurality of fingers projecting radially out from said plate shaped insert and located in a lower floor region and which have an extremely small axial dimension relative to said height of said radial outer surface of said plate-shaped insert.

8. The ring filter according to claim 5, further comprising a plurality of axial supports disposed on said ring collar projecting in a radially outward direction relative to said tubular frame for providing an axial stop on said tubular frame.

9. The ring filter according to claim 1, wherein said plate-shaped insert has a plurality of radially elastic flexible tongues projecting axially out from said plate shaped insert in a direction of said tubular frame wherein said plurality of radially elastic flexible tongues include as barbs on their free end for axial fixing on said tubular frame to form an interlocking connection with said tubular frame.

10. A cylindrical filter having two ends comprising:
    a) a filter material;
    b) a radially permeable tubular frame having two ends and which extends approximately over an entire axial length of said cylindrical filter radially inside, and adjacent to said filter material;
    c) a closure coupled to one end of said radially permeable tubular frame, said closure comprising:
       i) a plate shaped insert coupled to said radially permeable tubular frame; and
       ii) a molded closure section coupled to said plate shaped insert, extending radially outside said plate shaped insert covering an open end of said filter and formed from a foamed plastic; and
    d) a ring shoulder formed on said tubular frame opposite said ring shoulder joins a closed end of said filtering material of said ring filter.

* * * * *